April 30, 1957  F. J. TRECKER  2,790,292
POWER TRANSMITTING, TOWING AND CUTTING
ATTACHMENT FOR POWER MOWERS
Filed Feb. 16, 1954  3 Sheets-Sheet 2
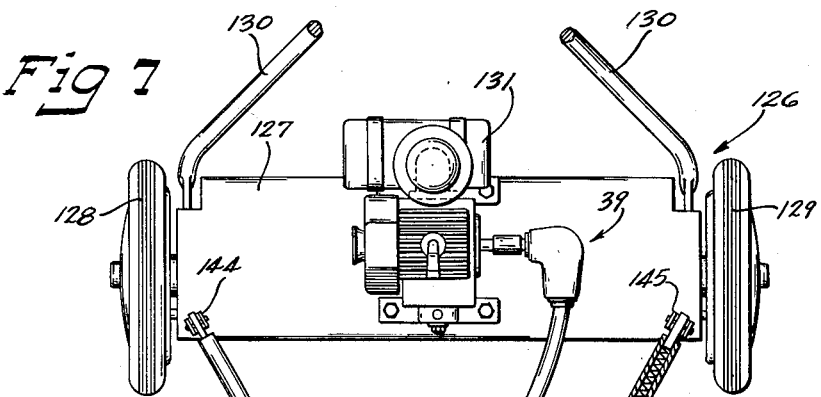
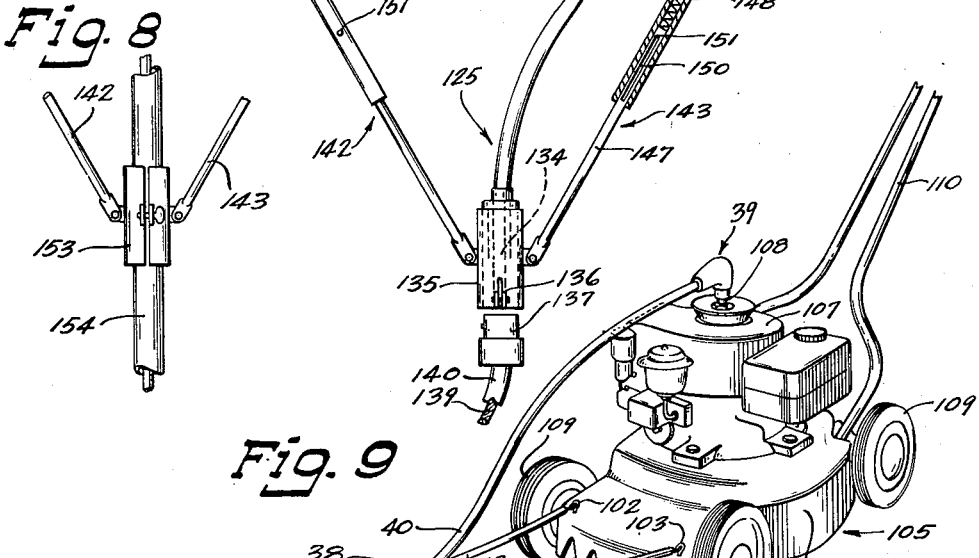
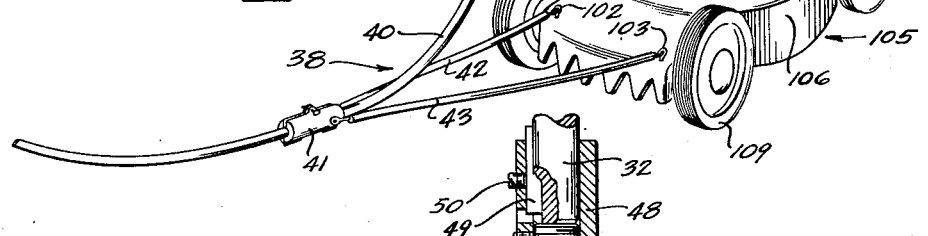
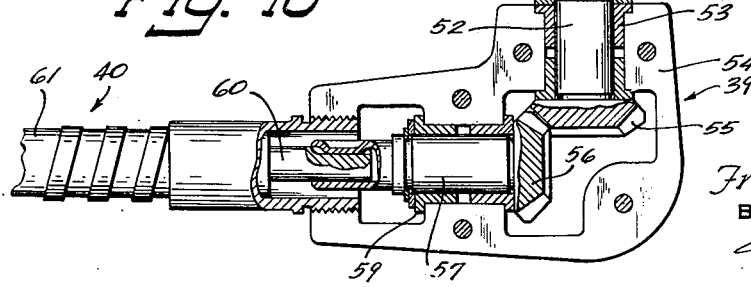
INVENTOR
Francis J. Trecker
BY
Elroy J. Wutschel
ATTORNEY

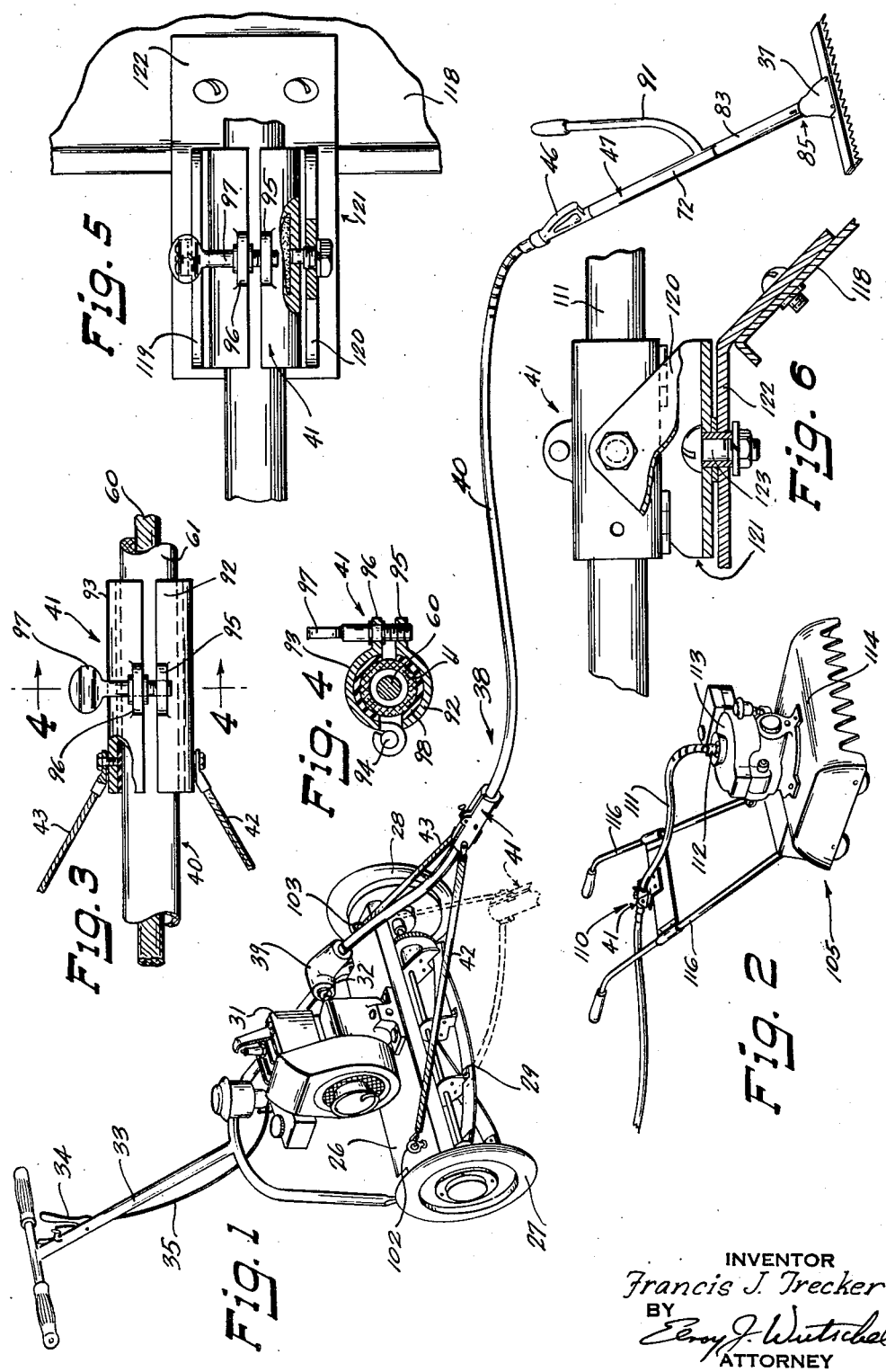

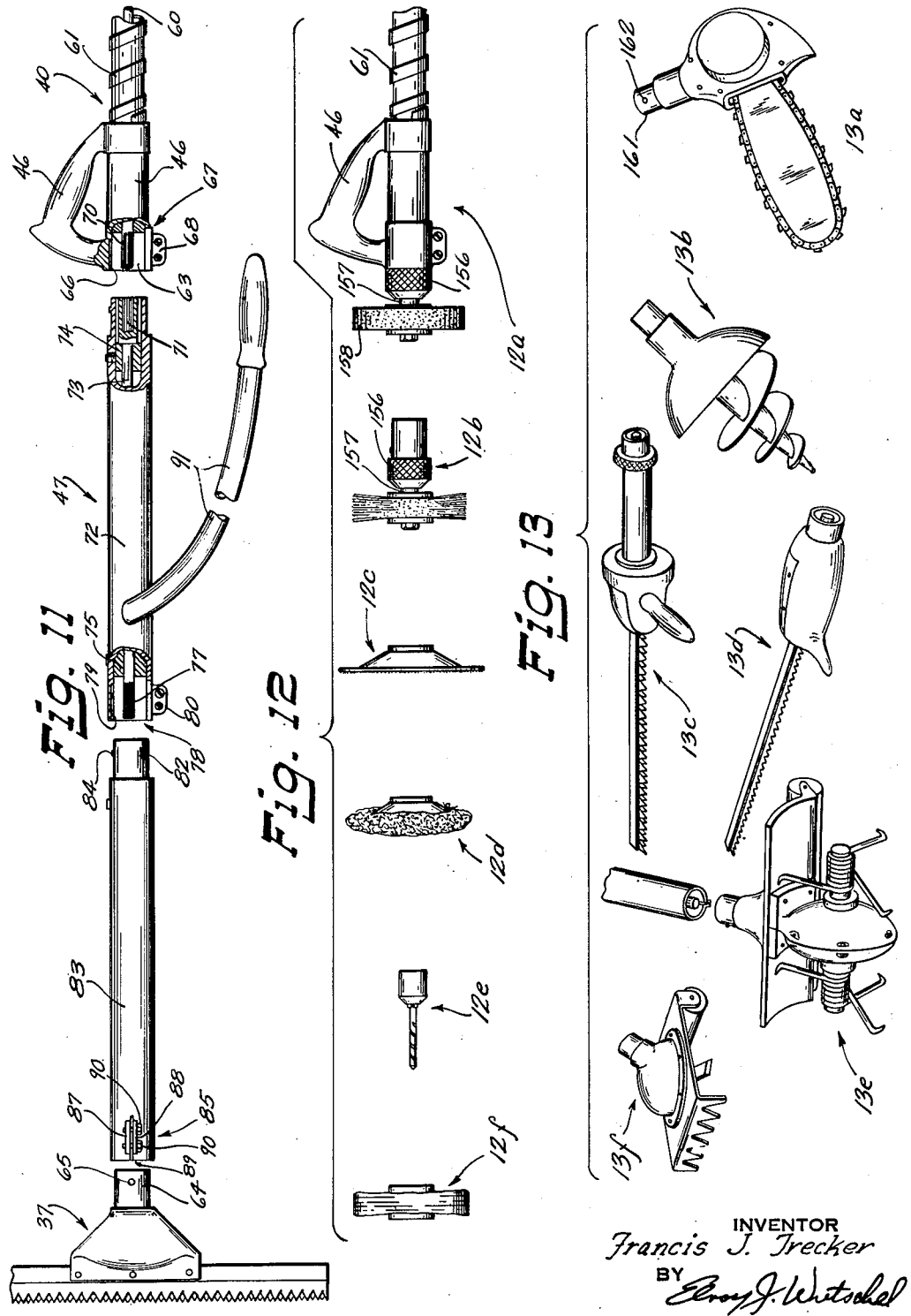

United States Patent Office 2,790,292
Patented Apr. 30, 1957

2,790,292

POWER TRANSMITTING, TOWING, AND CUT-
TING ATTACHMENT FOR POWER MOWERS

Francis J. Trecker, Chenequa, Wis.

Application February 16, 1954, Serial No. 410,542

4 Claims. (Cl. 56—25)

This invention relates generally to improvements in a combination machine for performing either conventional grass mowing or grass trimming operations and more particularly to improved means for driving a portable light weight hand tool that is especially adapted for operation out of doors.

Heretofore, it has been customary to provide a self-contained power source, such as an electric motor or an internal combustion engine, in certain types of portable hand tools intended primarily for out of door use. Such tools include portable sickle bar mowers, grass trimmers, cultivators, hedge trimmers, et cetera. In the event an electric motor supplied the operating power, it is obvious that a convenient source of electric power must be readily available. Even if such electric power is convenient, which is not always the case, the great length of electric cord sometimes interfered with the mobility and free use of the portable hand tool. On the other hand, using a self-contained internal combustion engine to power a hand tool did increase the possible range of movement, but also increased the weight to a point that the hand tool was much more difficult to use. Some portable hand tools, on the other hand, have been connected to be driven by a flexible driving shaft connected to be driven by a motor for a lawn mower. In such cases, the range of movement of the hand tool was necessarily limited by the length of the flexible driving shaft. In other words, before moving the hand tool to operate on an area beyond the length of the flexible shaft, it was necessary for the operator to first advance the mower power source to a new position. It is obvious that each of these methods of supplying power to drive portable hand tools imposed certain limitations upon the use of the tool.

A principal object of this invention is to provide improved means for driving a portable hand tool of the type intended primarily for use out of doors.

Another object of this invention is to provide an improved combination lawn mowing and lawn trimming machine.

Another object is to provide improved means for driving a light-weight, portably movable hand tool that obviates the necessity for a self-contained power source without sacrificing mobility of movement.

Another object of this invention is to provide improved power transmitting apparatus for driving a portable hand tool.

Another object is to provide an improved mobile power source for driving a portable hand tool in a manner to permit full mobility of the hand tool.

Another object is to provide improved combined power transmitting and towing apparatus adapted to convert a power driven lawn mower into a completely mobile source of power.

Another object of the invention is to provide an improved machine comprising a power driven lawn mower in combination with a plurality of portable hand tools selectively connectible to be driven by the power driven mower with the latter constituting a mobile source of power.

Another object is to provide improved means for economically converting a power driven lawn mower into a mobile power source.

A further object is to provide a plurality of selectively interconnectable driving shafts adapted to transmit power for operating a selected one of a plurality of portable hand tools.

A further object is to provide improved means for both towing and steering a power driven lawn mower.

A further object is to provide improved means for economically converting a power driven lawn mower into a mobile source of power.

A further object is to provide an improved towing and power transmitting apparatus that is detachably connectable to a power driven lawn mower and is simultaneously operative to tow the mower while transmitting power therefrom.

According to this invention, a lawn mower having a power source is provided with an improved unitary power transmitting and towing apparatus connected to drive a portable hand tool, such as a sickle bar mower. The improved power transmitting and towing apparatus comprises essentially a flexible driving shaft connected to be driven by the mower power source and connected at its opposite, or output end, to drive a portable hand tool. A bracket secured to the protective sheath of the flexible cable intermediately the opposite ends thereof is connected by means of a pair of cables to spaced apart portions of the mower to preclude any tension or excessive bending of that portion of the flexible shaft between the bracket and the mower power source. Thus, the cables, the bracket and that portion of the flexible driving shaft forwardly of the bracket cooperate to constitute a towing and steering device for moving the mower forwardly at the same time the flexible shaft is transmitting power to drive a portable hand tool. By means of this arrangement, the hand tool can be continuously moved in a generally forward direction to effect a continuous corresponding movement of the mower. During such an operation, the towing cables and bracket operate to cushion the flexible driving cable against excessive bending as well as against shock loads such as may be caused when the mower strikes an obstruction. To facilitate using the mower for a conventional mowing operation, the improved towing and power transmitting apparatus is arranged to be easily and quickly disconnected from the mower. Improved means are provided for operatively interconnecting a plurality of driving shafts between the mower power source and the hand tool to provide the greatest flexibility in use.

The foregoing and other objects of this invention which will become more fully apparent from the following detailed specification, may be achieved by the particular combination lawn mowing and lawn trimming machine constituting an exemplifying embodiment of the invention illustrated in and described in connection with the accompanying drawings in which:

Figure 1 is a view in perspective of a reel type lawn mower incorporating a combined towing and power transmitting apparatus for driving a portable hand tool, and constituting a preferred embodiment of the invention;

Fig. 2 is a view in perspective of a rotary type lawn mower incorporating a modified form of a combined towing and power transmitting apparatus;

Fig. 3 is an enlarged plan view, with parts broken away and shown in section, of a bracket for gripping the protective sheath of the power flexible transmitting shaft;

Fig. 4 is a view in vertical transverse section through the clamp bracket, taken along the lines 4—4 in Fig. 3;

Fig. 5 is an enlarged plan view, with parts broken away and shown in section, of the universally pivotable support bracket for a flexible driving shaft as shown in Fig. 2;

Fig. 6 is an enlarged side elevational view, with parts broken away and shown in section, of the pivotable support bracket taken partly in side elevation and partly in longitudinal vertical section;

Fig. 7 is a plan view, with parts broken away and shown in section, of a reel type lawn mower incorporating a modified form of a combined towing and power transmitting apparatus;

Fig. 8 is a fragmentary plan view of a modified form of bracket for pivotally supporting a flexible driving shaft;

Fig. 9 is a view in perspective of the combined towing and power transmitting apparatus incorporated in a rotary type lawn mower;

Fig. 10 is an enlarged plan view with parts broken away and shown in section of the right angle drive mechanism;

Fig. 11 is an enlarged view partly in side elevation and partly in section, showing a plurality of power transmitting shafts selectively connectable between a flexible shaft and a portable hand tool;

Figs. 12a to 12f inclusive illustrate a plurality of selectively connectable portable power driven hand tools adapted to be driven by the improved mobile power unit; and, Figs. 13a to 13f inclusive illustrate another group of portable power driven tools that are selectively connectable to be driven by the improved mobile power unit.

The particular mobile power unit illustrated in the drawings as exemplifying apparatus of the class adapted to be operated in accordance with the present invention, is a wheeled type, power driven lawn mower incorporating unitary towing and power transmitting apparatus, although it is understood the invention may be applied to other power driven garden tools with equal advantage.

Referring more specifically to the drawings and particularly to Figs. 1 and 2 thereof, the lawn mowers thereshown incorporate practical operative embodiments of improved towing and power transmitting apparatus for operatively interconnecting the mower to a portable hand tool, such as a sickle bar mower, in a manner to provide complete mobility of the hand tool during its operation. The entire apparatus is completely shown and described herein by way of a complete disclosure.

As shown in the drawings, the mower shown in Fig. 1 is of the reel type having a frame 26, a pair of ground engaging wheels 27 and 28 journalled toward the opposite outer ends of the frame 26 and a rotatable cutting reel 29 journalled in the frame 26. For rotating the cutting reel 29 there is provided a motor 31 secured to the frame 26 and having a horizontally journalled output shaft 32. The motor 31 is likewise connectable to rotate the ground wheels 27 and 28 for propelling the mower along the ground during a grass cutting operation. To guide the mower during a cutting operation, there is provided the usual upwardly extending handle 33, secured at its lower end to spaced apart portions of the frame 26, and carrying toward its upper end a pivotally mounted clutch control lever 34. The control lever 34 is operative through a flexible control shaft 35 to actuate a clutch mechanism (not shown) for selectively coupling the motor 31 to operatively rotate the cutting reel 29 and the ground wheels 27 and 28. During a grass mowing operation, the cutting reel 29 is disposed to cooperate with a bed knife (not shown) in well known manner.

Whenever the clutch control lever 34 is moved to disengaged position, the motor 31 is selectively connectable to drive a portable tool, such as the sickle bar mower 37 through the medium of a combined unitary towing and power transmitting apparatus 38 detachably connected to the mower. As shown in Fig. 1, the improved unitary power transmitting and towing apparatus 38 comprises essentially a right angle drive bracket 39, a flexible power transmitting drive shaft 40 having a power receiving input end and a power supplying output end, a bracket 41 clamped to the drive shaft, and a pair of flexible cables 42 and 43 interconnecting the bracket 41 to spaced apart portions of the frame 26. At its output end, the flexible drive shaft 40 is provided with a control handle 46 detachably secured to a tubular power transmitting extension shaft 47, that in turn, is operatively connected to drive the detachable sickle bar mower 37. Thus, with the combined towing and power transmitting apparatus 38 operatively connected to the mower as shown in Fig. 1, the motor 31 is operative to supply power for driving the sickle bar mower 37 for performing a grass cutting or trimming operation. It will be obvious that an operator can manipulate the handle 46 and shaft 47 to control movement of the sickle type mower 37 over an area adjacent the mower that is delimited by the length of the flexible drive shaft 40 and tubular extension shaft 47. Moreover, by means of the apparatus disclosed, an operator can progressively move the sickle bar mower 37 forwardly to perform continuous mowing or cutting operations. During such a continuous cutting operation, the flexible cables 42 and 43, the bracket 41 and that portion of the flexible shaft 40 forwardly of the bracket 41 cooperate to constitute a towing harness for effecting a generally forward movement of the mower that corresponds to the movement of the sickle bar mower 37.

To provide for complete mobility of the portable sickle bar mower, the various elements comprising the combined towing and power transmitting apparatus 38 are arranged to so cooperate as to effectively obviate damage to the flexible drive shaft 40 and to permit steering of the reel type mower as it is towed behind the sickle bar 37. To this end, as shown in Figs. 1 and 10, the right angle drive bracket 39 is detachably secured to the motor shaft 32 for pivotal movement about a horizontal axis. From the motor shaft 32, power is transmitted to drive a tubular adapter coupling 48 that is detachably secured thereto by means of a key 49 and set screw 50. The coupling 48 is fixedly secured at its opposite end to an input shaft 52 journalled in a sleeve bearing 53 carried within a housing 54 for the right angle drive mechanism 39.

At its opposite end, the input shaft 52 is provided with a bevel gear 55 for transmitting power to a complementary meshing bevel gear 56 secured to the end of a rotatable driven shaft 57. The shaft 57 is journalled to rotate in a sleeve bearing 59 carried within the housing 54, and is operatively connected at its opposite end to transmit rotatable driving power to the input end of the flexible drive shaft 40. As shown in Fig. 10, the flexible drive shaft 40 comprises an inner rotatable core 60 that is rotatably carried within a tubular protective outer sheath 61, both the core 60 and the protective sheath 61 being detachably connectable to the drive mechanism 39 in well known manner. With the end of the sheath 61 threadedly engaging the housing 54, as shown in the drawings, the rotatable core 60 is in driven engagement with the rotatable shaft 57 journalled in the right angle drive mechanism.

To provide the utmost flexibility in use, as shown in Fig. 11, the opposite output end of the flexible shaft 40 is provided with the handle 46 adapted to constitute an operating part of one or another of a plurality of interchangeable attachments or hand tools, such as the sickle bar mower 37. To accomplish this, the handle 46 is provided with a tubular recess or socket 63 adapted to receive a complementary tubular mounting end 64 of the sickle bar mower 37. For properly positioning the sickle bar mower 37 with respect to the handle 46, a locating pin 65 on the tubular end 64 of the mower is adapted to engage an axial recess or slot 66 formed in the socket 63 presented by the handle 46. A quick acting clamp 67 including two clamp screws 68 is provided to securely attach the mower 37 directly to the handle 46, in which event the handle 46 is operable to manipulate the mower for performing certain types of mowing or trimming operations. For transmitting power from the rotating inner shaft 60, Fig. 11, a splined male connector 70 attached to the end thereof and journalled in the handle 46 is adapted to engage a complementary splined driven element (not shown) concentrically journalled within the tubular attachment end 64 presented by the sickle mower 37.

A similar rotatable driven element 71, provided with internal splines that are likewise adapted to engage the externally splined connector 70, is provided at the rightward end of extension shaft 47. As thereshown, the extension shaft 47 is provided with a rigid tubular member 72 adapted to rotatably support an inner power transmitting shaft 73 in bearings 74 and 75. At its opposite or output end, the extension shaft 47 is provided with an externally splined rotatable connector 77, a circular recess or socket 78, a positioning key way 79, and a clamp 80. The clamp 80 of the shaft extension 47 is, in turn, adapted to releasably engage the tubular end 64 of the sickle mower 37, or a similar tubular end 82 formed on the input end of another shaft extension 83, the latter likewise being provided at its input end with an internally splined connector (not shown) and locating pin 84. At its opposite, or output end, the second shaft extension 83 is provided with a rotatably driven externally splined male connector (not shown) adapted to be detachably connected to transmit power for a portable hand tool. To this end, the second extension shaft 83 is provided at its output end with a tubular clamp 85, which is identical to the clamps 80 and 68 respectively associated with the extension shaft 47 and flexible shaft. As shown in Fig. 11, the tool receiving clamp 85 comprises a pair of spaced apart, radially extending lugs 87 and 88 secured to outer periphery of the shaft end, at the opposite sides of a slot 89. Two clamp screws 90 extending through apertures in the lug 88, threadedly engage the lug 87 to selectively urge the tool receiving socket (not shown) of the shaft 83 into clamping engagement with the tubular input end of a portable hand tool.

By means of this arrangement, therefore, the utmost flexibility is provided in selectively interconnecting the various cooperatively engageable members including the flexible shaft handle 46, the extension shaft 47, the second shaft extension 83, and the sickle bar mower 37. Thus, the handle 46 and flexible shaft 40 can be connected directly to the sickle mower 37 for certain trimming operations. Likewise, the handle 46 and shaft 40 can be coupled to the input end of the shaft extension 47 with the sickle mower 37 being connected to the opposite end thereof for certain other trimming operations. In such a case, with the handle 46, extension shaft 47 and sickle mower 37 operatively interconnected, a laterally extending handle 91 secured to the extension shaft 47 is so positioned relative to the handle 46 that an operator can easily manipulate the sickle mower 37. For still other classes of trimming operations, both the extension shaft 47 and the shaft extension 83 can be operatively interconnected between the handle 46 and the sickle mower 37. This arrangement is particularly advantageous in those trimming operations that require the operator to remain some distance from the area to be trimmed, such as trimming weeds under the surface of water or trimming under overhanging shrubs.

Regardless of whether the sickle bar mower 37 is coupled directly to the handle 46, to the extension shaft 47 or to the shaft extension 83 as fully explained hereinbefore, an operator can manipulate the sickle mower 37 as required and without being hindered or limited by the motor 31 mounted on the reel type mower, shown in Fig. 1. Assuming that the handle 46, extension shaft 47 and sickle bar mower 37 are operatively connected as shown in Fig. 1, the operator can advance the sickle mower 37 to trim grass or weeds while the reel type mower with the power source 31 is being towed along. As the sickle bar mower 37 is being advanced, the bracket 41, the flexible cables 42 and 43, and the portion of the flexible shaft 40 forwardly of the bracket 41 function as a combined towing and power transmitting apparatus. Likewise, the bracket 41 and the cables 42, 43 operate to assist in steering the mower as it is being towed, and function to preclude sudden shocks and excess bending of the flexible drive shaft 40. In other words, this arrangement provides for full mobility of a portable hand tool and is particularly adapted to out of door use where the mower is being advanced over irregular or uneven terrain.

As shown in Figs. 1, 3 and 4, the bracket 41 comprises two semi-tubular elements 92 and 93 pivotally secured at one edge by a hinge pin 94, and being provided at their opposite edges with two outwardly extending flanges 95 and 96. A clamp screw 97 journalled in the flange 96 is adapted to threadedly engage the flange 95 for retaining the elements 92 and 93 in clamping engagement encircling the protective outer sheath 61 of the flexible shaft 40. A resilient cushion 98 is interposed between the elements 92 and 93 of the bracket 41 and the sheath 61 to reduce shock loads on the flexible drive shaft 40 that might occur as it is being towed. The flexible cables 42 and 43, in turn, are connected at one of their ends to the bracket 41, and at their opposite ends to eye bolts 102 and 103 secured to spaced apart portions of the frame 26 on opposite sides of the motor 31. The length of the cables 42 and 43 is such as to eliminate any tension on that portion of the flexible drive shaft 40 extending between the bracket 41 and the right angle drive mechanism 39. The arrangement of the bracket 41 and the right angle drive bracket 39 permits freely pivotable movement of the flexible drive shaft 40 in a vertical plane as well as a horizontal plane.

In using the apparatus, the operator can proceed directly forward in which case the reel type mower, Fig. 1, will be moved along the identical straight path of movement. Likewise, the operator can turn either to the left or right, and the mower will be towed along without endangering the flexible shaft by kinking or bending. In making a right turn, for example, as shown in the dotted lines in Fig. 1, the towing tension is exerted on the portion of the flexible shaft 40 forwardly of the bracket 41, on the bracket 41, and the cable 43 to cause the wheel 28 to advance at a faster rate than the wheel 27, or, in effect, actually steering the mower as required. During the rightward turning interval no towing tension is exerted against the cable 42. In a similar manner, the sickle mower 37 can be turned and advanced in a leftward direction. Thus, as long as the operator proceeds in a generally forward direction, the combined towing and power transmitting apparatus 38 provides for full mobility in using a portable hand tool such as the sickle mower.

Whenever the reel type mower is to be used for its primary function, instead of as a mobile power unit, the entire apparatus 38 is quickly detachable therefrom by simply disconnecting the right angle drive mechanism 39 from the motor shaft 32 and the cables 42 and 43 from the eye bolts 102 and 103. This reel type mower is then operable in the usual manner, to rotate the cutting reel 29, for performing a conventional grass cutting operation. In a similar manner the unitary towing and power transmitting apparatus can be re-attached to the reel type mower, in Fig. 1, for again utilizing the mower as a mobile power source to drive a portable hand tool.

It will be obvious that the improved towing and driving apparatus provides an economical means of utilizing a mower motor to drive portable hand tools, and without imposing limitations in the use of mobility of such tools. In other words, this arrangement provides the advantages of mobility usually associated with portable tools having a self-contained motor, without the disadvantage of the additional weight added by such a self-contained motor, or the disadvantage of long cumbersome electric cords. It will be equally obvious that a mower incorporating the improved driving apparatus 38 is provided with a greatly expanded range of usefulness without the additional expense of single duty portable tools powered by self-contained motors. Although the improved towing and power transmitting apparatus 38 is incorporated into the reel type mower shown in Fig. 1, this entire apparatus can be constructed in the form of an attachment for converting other reel type mowers (not shown) into useful mobile power units. To accomplish this, it is necessary only to attach the eye bolts 102 and 103 to a mower frame, and provide a suitable coupling 48, Fig. 10.

Generally speaking, mowers of the reel type, Fig. 1, must be towed in a forward direction since the driving mechanism (not shown) to the wheels 27 and 28 precludes free wheeling movement in a rearward direction. In like manner, it is advantageous to tow some rotary mowers in a forward direction. To this end, as shown in Fig. 9, the improved unitary towing and power transmitting apparatus 38 is incorporated in a rotary type lawn mower 105, having a frame 106, enclosing a cutting blade (not shown) that rotates about a vertical axis. For driving the cutting blade to perform a conventional grass cutting operation, there is provided a motor 107 secured to the frame 106 and having a vertical motor shaft 108. The frame is movably supported upon ground wheels 109 and guided for a conventional mowing operation by a handle 110. As shown in Fig. 9, the upper end of the motor shaft 108 is operatively connected to drive the right angle drive mechanism 39 and flexible shaft 40. As hereinbefore explained with respect to Fig. 1, the apparatus 38 shown in Fig. 9, including the flexible shaft 40, bracket 41 and flexible cables 42 and 43 are operable to tow the rotary mower 105 at the same time the shaft 40 is connected to operatively drive a portable hand tool (not shown).

Inasmuch as some rotary type lawn mowers can be towed in either a forwardly or a rearwardly direction, there is provided a modified form of towing and power transmitting apparatus 110 as shown in Fig. 2. As there shown, the input end of a flexible drive shaft 111 is attached directly to the end of a vertical motor shaft 112 driven by a motor 113 carried on a frame 114, constituting a protective enclosure for a cutting blade (not shown). The frame 114 is movably supported by ground engaging wheels (not shown) and has secured to its rearward portion a pair of spaced apart handles 116 by which the mower can be guided forwardly for performing a conventional grass cutting operation.

With the flexible shaft 111 operatively connected to be driven by the motor 113 as shown in Fig. 2, the rotary mower 105 can be towed rearwardly in a manner to constitute a mobile power unit for driving a portable hand tool (not shown) operatively connected to the opposite end of the flexible drive shaft. To accomplish this, the tubular clamp bracket 41 affixed to the flexible drive shaft 111 is pivotally secured to a cross member 118 extending between the handles 116. As shown in Figs. 2, 5 and 6 the bracket 41 is mounted for pivotal movement about a horizontal axis between the upstanding arms 119 and 120 of a yoke 121 that is secured to a support plate 122 by a bolt 123 for pivotal movement about a vertical axis, the support plate 122, in turn, being affixed to the cross member 118. By means of this arrangement, the tubular clamp bracket 41 is carried for universal pivotal movement to avoid excessive kinking of the flexible drive shaft 111 as tension for towing is applied to the forward end thereof. The tubular clamp is so secured to the protective sheath of the flexible drive shaft 111 as to preclude any tension upon that portion of the shaft extending rearwardly of the bracket toward the motor 113. Whenever the rotary mower 105, shown in Fig. 2 is to be used for a conventional lawn mowing operation, the towing and power transmitting apparatus 110 can be quickly detached therefrom.

In a further modification, there is shown in Fig. 7, a unitary towing and power transmitting apparatus 125 incorporated in a reel type lawn mower 126 comprising a frame 127, a pair of ground wheels 128 and 129, a handle 130, and a motor 131 connected to drive a cutting reel (not shown) and the wheels for conventional mowing operations. With the apparatus 125 operatively connected to the mower 126, as shown however, the motor 131 is operable to transmit power to the right angle drive mechanism 39 from which power is transmitted to drive a flexible drive shaft 133 which is, in turn, connected to drive an externally splined male connector 134 rotatably journalled in a tubular support member 135. The support member 135 is provided with an internally formed circular recess or socket (not shown) and a clamp 136 adapted to clampingly engage a tubular end piece 137, that rotatably carries an internally splined element (not shown) attached to the end of a rotatable core 139 of a flexible drive shaft 140. With the tubular end piece 137 clamped within the tubular support member 135, power is transmitted from the male connector 134 to drive the complementary internally splined connector in the end piece and thence through the flexible shaft 140. At its opposite end, the flexible shaft 140 is provided with a handle (not shown), such as the handle 46 shown in Fig. 11, which is adapted to operatively engage the extension shaft 47, the shaft 83 or the sickle bar mower 37 as fully explained hereinbefore.

With the tubular end piece 137 of the flexible shaft 140 attached to the tubular driving support member 135, forward movement of the shaft causes corresponding forward movement of the mower 126 without applying tension to the flexible shaft 133 interconnected between the motor 139 and tubular member 135.

For accomplishing this and controlling the directional towing movement of the mower 126, the tubular support member is pivotally secured at its opposite sides to a pair of telescoping arm members 142 and 143. The arm members 142 and 143 are provided with bifurcated opposite ends that are secured to upstanding brackets 144 and 145 for pivotal movement about horizontal axes the brackets 144 and 145, in turn, being movably secured to spaced apart portions of the frame 127 for pivotal movement about vertical axes.

By means of the universal pivotal mounting of the inner ends of the telescoping arms 142 and 143, the tubular support member 135 is arcuately movable either upwardly or downwardly, in a vertical plane relative to the mower 126. In like manner, the support member is movable laterally through an arcuate path of movement due to the pivotal connections at the opposite inner ends of the arm members 142 and 143, the latter movement tending to steer the mower 126 as it is being towed.

As shown in Fig. 7, each of the telescoping arm members 142 and 143 comprises an inner rod 147 that is slidably engaged by a tubular member 148 for relative axial slidable movement, a compression spring 149 within the tubular member 148 abutting the inner end of the rod 147 for normally retaining the members in their extreme extended positions of axial movement. To limit the extent of relative movement, the rod 147 is provided with a transverse slot 150 that is engaged by a pin 151 extending through the opposite sides of the tubular member 148. The pin 151 cooperates with the slot 150 to restrain the rod 147 and tubular member 148 against relative rotational movement as well as to limit the longitudinal axial movement.

Whenever, the flexible drive shaft 140 is towed in a rightward direction, the tubular support member 135 is pivoted against the telescoping arm member 143, which, in turn, exerts a towing tension to move the wheel 129 at a faster rate than the wheel 128. At the same time, the telescoping member 142 is compressed inwardly to exert a rearward thrust against the opposite end of the mower frame 127, the combined action of the telescoping members 142 and 143 operating to steer the reel type mower 126 in a rightward direction. In a similar manner, the mower 126 can be steered in a leftward direction at the same time power from the motor 131 is being transmitted to operate a portable hand tool (not shown) connected to the opposite end of the flexible drive shaft 140. The entire unitary towing and power transmitting apparatus is quickly detachable from the mower 126.

In a further modification, as shown in the fragmentary view, Fig. 8, the forward ends of the telescoping members 142 and 143 are pivotally secured to the opposite sides of a tubular clamp element 153. The clamp element 153 engages the protective outer sheath of a flexible drive shaft 154 the inner end of which is connected to be driven by the right angle drive mechanism 39, Fig. 7, and the outer end of which is connected to drive a portable hand tool (not shown).

To illustrate the versatility and flexibility of the improved towing and power transmitting apparatus, there are shown in Figs. 12 and 13 a variety of portable hand tools that can be removably attached to the output end of a flexible drive shaft, exemplified in Fig. 11 by the shaft 40 and operating handle 46.

In Fig. 12 are shown a plurality of accessory attachments requiring a driving plug adapter 156, Fig. 12a, to be clamped within the circular recess formed in the handle 46. The driven adapter 156 rotatably carries a threaded spindle 157, connected at its inner end to be driven by an internally splined female element (not shown) that is operatively connected to be driven by the externally splined connector 70 journalled in the handle 46. The driving adapter 156, Figs. 12a and 12b, is provided with a tubular end piece and locating pin, enabling the adapter to be operatively connected and clamped within the respective circular recess or socket presented by the operating control handle 46, Fig. 11, the extension shaft 47 or the shaft extension 83, depending upon the accessibility of the area to be operated upon. With the driving adapter 156 operatively connected to the handle 46, either the grinding wheel 158, Fig. 12a, or the wire brush 159, Fig. 12b, is adapted to be operatively mounted on the threaded spindle 157, in well known manner. In a like manner, a sanding disc 12c, buffer 12d, drill chuck 12e and buffing disc 12f are interchangeably arranged to be mounted on the threaded spindle 157 journalled in the driving adapter 156.

The portable hand tool or attachments shown in Fig. 13, are of the type generally associated with out of door work. The portable chain saw 13a is provided with a tubular end piece 161 and locating pin for clamping engagement within the tubular socket presented by the handle 46, Fig. 11, extension shaft 47, or shaft extension 83 in a manner that driving power is transmitted therebetween for operating the saw. The rotatable earth auger 13b, hedge trimmer 13c, and tree trimmer 13d are also connected to be driven by the flexible shaft handle 46, as are the cultivator 13e and rotary grass trimmer 13f. It is not deemed necessary to describe in detail the attachments shown in Fig. 13, as the use of each is believed sufficiently well known in the art. However, the interchangeability of these attachments renders the entire combined towing and power transmitting apparatus, as well as the mower constituting the mobile power source, useable for a wide variety of different purposes. Irrespective of which attachment is connected to be driven by the flexible shaft handle 46, an operator has the full mobility of movement required for the particular selected tool.

From the foregoing explanation of the construction and operation of preferred embodiments of the invention, it is apparent that the inventor has provided an improved combination machine adapted to perform conventional lawn mowing operations as well as drive portable hand tools with equal facility.

Although several embodiments of the invention have been shown and described, it will be obvious to those skilled in the art to which this invention relates, that various modifications in the manner of constructing the apparatus may be effected without departing from the spirit and scope of the invention as defined in the subjoined claims.

Having thus set forth the principles of the invention in connection with the foregoing description of an illustrative preferred embodying structure, I hereby claim as my invention or discovery:

1. A combined unitary power transmitting and towing device for a power driven lawn mower having ground engaging wheels and a motor carried therebetween comprising; a flexible drive shaft provided with a tubular protective sheath and a rotatable inner core journalled therein and having a power receiving input end as well as a power supplying output end, said flexible drive shaft being adapted to be connected at its input end to receive power from said motor in a manner that said rotatable core is driven thereby; an operating hand grip connected to the output end of said flexible drive shaft; an outwardly extending rotatable connector journalled in said hand grip and connected to be driven by the core of said flexible drive shaft; a clamp carried by said hand grip; a portable power operated hand tool having a tubular shank portion detachably arranged to be secured to said hand grip by said clamp, said portable hand tool being adapted to be driven by said rotatable connector whenever it is clamped to said hand grip; a clamp member secured to the protective sheath of said flexible drive shaft intermediate the input and output ends of said flexible shaft; and a pair of cables adapted to be connected at their rearward ends to spaced apart portions of said mower and at their forward ends to said clamp member, said cables being of a short enough length to preclude tension on that portion of said flexible shaft extending between said clamp member and the motor; whereby said portable hand tool may be moved forwardly by imparting a pull on said flexible drive shaft as a tow line to tow the mower forwardly and no tension will be applied to that portion of said flexible drive shaft extending between said clamp member and the motor.

2. A combined unitary power transmitting and towing device for a power driven lawn mower having ground engaging wheels and a motor carried therebetween with the motor having an output shaft; a right angle drive mechanism pivotally secured to said output shaft for pivotal movement and connected to transmit power from said output shaft; a flexible power transmitting drive shaft having a tubular protective sheath with a rotatable inner core journalled therein and connected at one end to be driven by said pivotable right angle drive mechanism; a portable power operated hand tool connected to the opposite end of said flexible drive shaft to be driven by its rotatable inner core; a clamp secured to the protective sheath of said flexible drive shaft intermediate of the opposite ends thereof; a pair of cables connected at their forward ends to said clamp element and adapted to be connected at their respective rearward ends to spaced apart portions of the mower, said cables being of short enough length to preclude tension on that portion of said flexible drive shaft between said clamp element and said right angle drive mechanism whenever said clamp element is moved to its most forward position relative to the mower; whereby a forward towing force exerted on the portion of said flexible drive shaft forward of said clamp operates to effect towing tension on said clamp and said cables for effecting a corresponding forward towing movement of the mower without applying any of the towing force to said right angle drive mechanism.

3. A combined unitary power transmitting and towing device for a power driven lawn mower having ground engaging wheels and a motor carried therebetween with the motor having an output shaft; a coupling connectable to the output shaft of the motor to receive driving power therefrom; a flexible power transmitting drive shaft having a tubular protective sheath with a rotatable inner core journalled therein, said flexible transmitting drive shaft being attached to said coupling to receive power from it for driving its rotatable inner core that has an output end to which the power received from said coupling is transmitted; a rigid power transmitting extension shaft selectively connectable at one end to be driven by the output end of the rotatable inner core of said flexible power transmitting shaft; a portable power operable hand tool adapted to be coupled to the opposite end of said rigid power transmitting extension shaft; a cutting element operably carried by said hand tool and connected to be actuated whenever said hand tool is coupled to said extension shaft and said extension shaft is operatively connected to receive power from the motor; a clamp affixed to the protective sheath of said flexible power transmitting drive shaft; a pair of separate attachment means adapted to be respectively connected at one end to spaced apart portions of the mower and at their opposite ends to said clamp, said attachment means being of a short enough length to preclude tension on that portion of said flexible power transmitting drive shaft extending between said clamp and said coupling; whereby said power operable tool may be moved forwardly by imparting a pull on said flexible drive shaft as a tow line to tow the mower forwardly without applying any of the towing force to the output shaft of the motor.

4. A combined unitary power transmitting and towing device for a power driven lawn mower having ground engaging wheels and a motor carried therebetween with the motor having an output shaft; a flexible power transmitting drive shaft having a tubular protective sheath with a rotatable inner core that is adapted to be coupled to the output shaft of the motor for receiving power therefrom and having an output end to which the power received from the output shaft of the motor is transmitted; a portable power operable hand tool adapted to be coupled to the output end of said flexible power transmitting drive shaft to be driven by its rotatable inner core; a clamp secured to the protective sheath of said flexible power transmitting drive shaft; a pair of separate attachment means adapted to be respectively connected at one end to spaced apart portions of the mower and at their opposite ends to said clamp, said attachment means being of a short enough length to preclude tension on that portion of said flexible power transmitting drive shaft extending between said clamp and the output shaft of the motor; whereby said power operable hand tool may be moved forwardly by imparting a pull on said flexible power transmitting drive shaft as a tow line to tow the motor forwardly without applying any of the towing force to the output shaft of the motor.

References Cited in the file of this patent

UNITED STATES PATENTS

| | | |
|---|---|---|
| 1,420,309 | Drake | June 20, 1922 |
| 2,002,396 | Hite | May 21, 1935 |
| 2,091,827 | Mercatoris | Aug. 31, 1937 |
| 2,500,168 | Du Pont | Mar. 14, 1950 |
| 2,519,936 | Sayre | Aug. 22, 1950 |
| 2,553,463 | McCulloch | May 15, 1951 |